United States Patent [19]
Vesterinen

[11] Patent Number: 5,940,790
[45] Date of Patent: Aug. 17, 1999

[54] MULTILINGUAL OPERATION AND MAINTENANCE INTERFACE FOR A TELECOMMUNICATION EXCHANGE

[75] Inventor: Timo Vesterinen, Espoo, Finland

[73] Assignee: Nokia Telecommunications Oy, Espoo, Finland

[21] Appl. No.: 08/687,519

[22] PCT Filed: Feb. 14, 1995

[86] PCT No.: PCT/FI95/00065

§ 371 Date: Aug. 7, 1996

§ 102(e) Date: Aug. 7, 1996

[87] PCT Pub. No.: WO95/21529

PCT Pub. Date: Aug. 17, 1995

[30] Foreign Application Priority Data

Feb. 14, 1994 [FI] Finland .................................... 940689

[51] Int. Cl.⁶ .............................. G06F 17/28; H04M 3/64
[52] U.S. Cl. ................................................. 704/8; 379/243
[58] Field of Search .................... 704/1–2, 7–8; 379/10, 12, 14, 242, 243

[56] References Cited

U.S. PATENT DOCUMENTS

| | | | |
|---|---|---|---|
| 4,595,980 | 6/1986 | Innes | 704/8 |
| 4,782,506 | 11/1988 | Sevcik | 379/10 |
| 5,347,564 | 9/1994 | Davis et al. | 379/12 |
| 5,428,772 | 6/1995 | Merz | 704/1 |

FOREIGN PATENT DOCUMENTS

| | | | |
|---|---|---|---|
| 121 071 | 10/1984 | European Pat. Off. | G06F 3/02 |
| 335 139 | 10/1989 | European Pat. Off. | G06F 9/44 |
| 413 486 | 2/1991 | European Pat. Off. | G06F 9/44 |
| 557 681 | 9/1993 | European Pat. Off. | G06F 9/44 |
| 94/11811 | 5/1994 | WIPO | G06F 9/44 |

*Primary Examiner*—Forester W. Isen
*Assistant Examiner*—Patrick N. Edouard
*Attorney, Agent, or Firm*—Pillsbury Madison & Sutro LLP

[57] ABSTRACT

A multilingual operation and maintenance interface for a telecommunication exchange. The interface includes a plurality of modules and a plurality of resource files. Alphanumeric information in a different target language and related to interactive communication with the interface is included in a resource file. At least one resource file is an intermediate language file including intermediate language information other than alphanumeric information in a target language. An external device is provided to display a control response of the operation and maintenance interface in the target language.

11 Claims, 4 Drawing Sheets

MULTILINGUAL OPERATION AND MAINTENANCE INTERFACE FOR A TELECOMMUNICATION EXCHANGE

BACKGROUND OF THE INVENTION

1. Field of the Invention

The invention relates to a multilingual operation and maintenance interface for a telecommunication exchange, in particular a telephone exchange.

2. Description of the Related Art

Telephone exchanges comprise an operations and maintenance unit (OMU), which handles operations related to the operation and maintenance of the exchange. It acts as an interface between the operator and the exchange system. Through the OM unit the exchanges are connected to an operation and maintenance network through which the teleoperator can control, from one place in a centralized manner, several exchanges positioned physically far away. The OM unit of the exchange collects alarms and produces alarm reports, and it also operates in conjunction with the central memory (CM) of the exchange, which stores files concerning subscriber data, charging, signalling, routing and the configuration of the exchange, the operator thus being able to read and change the contents of these files. Its hardware comprises for example a central processing unit (CPU) and, as a separate mass storage, one or several hard disk drives and a diskette drive.

The programs of the OM unit and the operator's computer terminal connected to the unit via an O&M network form the man-machine interface (MMI) between the exchange and the operator. The operator gives commands to the exchange either locally or via remote control by using a man-machine language (MML), the I/O syntax of which is determined in the CCITT Recommendations Z.317 to Z.341. In the MML, there is a separate command for each function. The software is hierarchical and consists of the following basic components. A session begins from the main level, whereupon the display comprises a list of command classes. The command classes form the command class level, and by selecting one command class from the main level, the user receives the menu of the command groups of that class. Each command group is formed of 4 to 8 commands, and by selecting the desired command group it is possible to reach the desired command. The division is functional, so that a command class is responsible for one block of functions, such as the commands for subscriber administration or routing. A command group is responsible for a smaller selection of interrelated commands, for example commands related to the processing of the abbreviated dialling services of the subscriber. The software is based on the menus, and the operator is guided to the right command step by step by means of the menu. The MMI enables the simultaneous existence of several command sessions in the same system. The sessions are mutually completely independent; however, the simultaneous manipulation of the same information from different sessions is prevented.

FIG. 1 shows the menu of the main level. Next to a character there is a name of a command class in plain text, and thus when a character is chosen, access is provided gained to the command group menu of that command class, and from there to the commands of the group by choosing the character of a desired command group in a similar manner. After this, the command can be written. The command form could be for example XRCI:GSW:NCGR= OUTGRP. The command comprises command characters, in this case XRCI, and the subsequent parameters separated by a colon. When the operator is giving a command, the MML program provides, after the command characters have been given, information in text form about what kind of parameters can be used. Each time a parameter has been given, the program provides instructions related to the next parameter. The program gives instructions to the operator at each level, whereupon the operator seldom needs to seek help in the manuals. Giving commands does not require any special skills, the only thing that is required is naturally that the operator understand the language in which the on-line instructions, shown in text form on the display, are written.

The instruction messages, as well as the headings output by the program, are in known exchange systems written in the program code itself, and they are unilingual, the most common default language probably being English. However, telephone exchanges are supplied to very different linguistic environments, whereupon even good on-line instruction messages for commands are not adequate if the operators cannot understand the language in which they are written. Therefore, the manufacturers need to produce exchanges having an MMI which produces text information in the operator's own language. However, one problem is that it is difficult to provide exchanges with instruction messages in a particular language, since the texts are often closely related to the (English) programs of the commands.

Another problem concerns the output format, comprising headings and data, produced by the MML program. When networks employ management programs run by a separate network management computer, which controls, with its control programs, a telephone exchange through an I/O interface of the OMU of the exchange, the network management program must first separate the text sections from the output of the MML program it has received. The data can be processed further only after this procedure. The network management program must thus search for the information it needs from the program of the OMU. When changes are made in the program of the OMU, thus altering their response, the network management computer can no longer distinguish which information to use, wherefore the network management program cannot control the exchange in the desired manner.

One solution to the first problem is naturally to rewrite the MML program to produce outputs in the language desired by the operator. However, it is difficult, since the supplier does not always master the operator's native language well enough. Another known solution is to use a separate text database in connection with the operator's computer. A text record provided by the MML program in default language (often English) and a translation of this text record into the native language of the operator are stored in the text database. When program gives the text output, the operator's computer retrieves, first the corresponding text from the text database, then the translation linked to this text, and in the end shows the translation on the display unit. Due to the search method, this method is slow.

Patent Application EP-0121071, to IBM, discloses a method which enables simultaneous multilingual operation in a data processing system. In the method disclosed, when an application program wants to transmit a message, it requests, via a particular macro comprising a message index, the message request service to perform a task. The service directs the request to a message combination block, which on the basis of a message index and a language index given by the operator of the beginning of the session when he signed onto the computer, retrieves the right message in the right language from a message model data collection stored in mass storage. This application thus discloses a method of composing a message by means of a message model data collection outside the software. The drawback of such a method is, however, that the message model data collection is very large, wherefore a search on the basis of two indexes can take a long time, and also the language cannot be changed during the session.

BRIEF SUMMARY OF THE INVENTION

The purpose of this invention is to provide an operation and maintenance interface which avoids linguistic problems when controlling the exchange which makes it possible for the creation, by a operator of language and an output format of texts to be output. Thus, an operator whose language is Chinese or Japanese, for example, which is based on word-signs, can create the output texts.

Another objective is to provide an operation and maintenance interface which produces, instead of text in the target language, information desired by the operator.

This invention applies to telephone exchanges a method known, per se, of separating the program and the texts related thereto. The exchange according to the invention is characterized by a combination of two features. The first characteristic feature is that in the command groups encoded into program modules, all the alphanumeric information given to the operator by the MLL program in each step during an interactive session is separated from the actual program code as resource files. There may be several resource files, and the texts of each of them are written in a different language. Thus, there may be a resource file, for example, in English, Russian, German and so forth. During the loading of the program modules needed in each operation and maintenance session, the related resource files in a desired language are loaded, the files thus determining the language of the operation and maintenance interface to be followed during the session. Several languages are thus possible, and furthermore, the language can be changed freely during the same session, even though one and the same command software is used. The selection, loading and use of the language is quick, and the operator does not notice a significant delay. The software can be built up in an economical manner the code can be optimized, regardless of problems, concerning the character set and translation, generally caused during the programming stage by versions in different languages. The other characteristic feature is that at least one resource file is a special intermediate language file which does not comprise any text in a human language, but contains intermediate language information instead of alphanumeric text.

According to a first embodiment, the intermediate language information is an individual numerical code, whereupon the text section in the flow of information arriving through the I/O interface of the OM unit is replaced with an individual numerical code. The numerical code acts as a search key, according to which the alphanumeric text or other information corresponding to the search key can be immediately retrieved from the mass storage of the operator's computer to be shown on the display.

According to a second embodiment, the intermediate language file is created by the operator himself. The operator sets the code characters he desires as the intermediate language information. These code characters replace the normal text sections meant for a human in the flow of information arriving to the operator's computer, e.g. to the network management computer, via the I/O interface of the OMU. Thus, the flow of information originally intended for a human is changed to information meant for a machine and suitable for machine processing. The codes may be different control characters intended for the operator's computer, which processes the incoming data flow in the desired manner by means of these characters. The user can thus easily produce for example different graphic representations of the command response, whereas a conventional exchange produces for the same command response a heading text and a series of successive numbers. Processing information produced by a conventional exchange is thus difficult, whereas in the manner according to this embodiment the operator automatically receives the information in the desired form. The operator is free to create a desired number of intermediate language files and he can freely decide which intermediate language file is used during the session.

BRIEF DESCRIPTION OF THE SEVERAL VIEWS OF THE DRAWINGS

In the following, the invention will be described in greater detail by means of examples with reference to the accompanying drawing, in which.

DETAILED DESCRIPTION OF THE INVENTION

Figure 1:
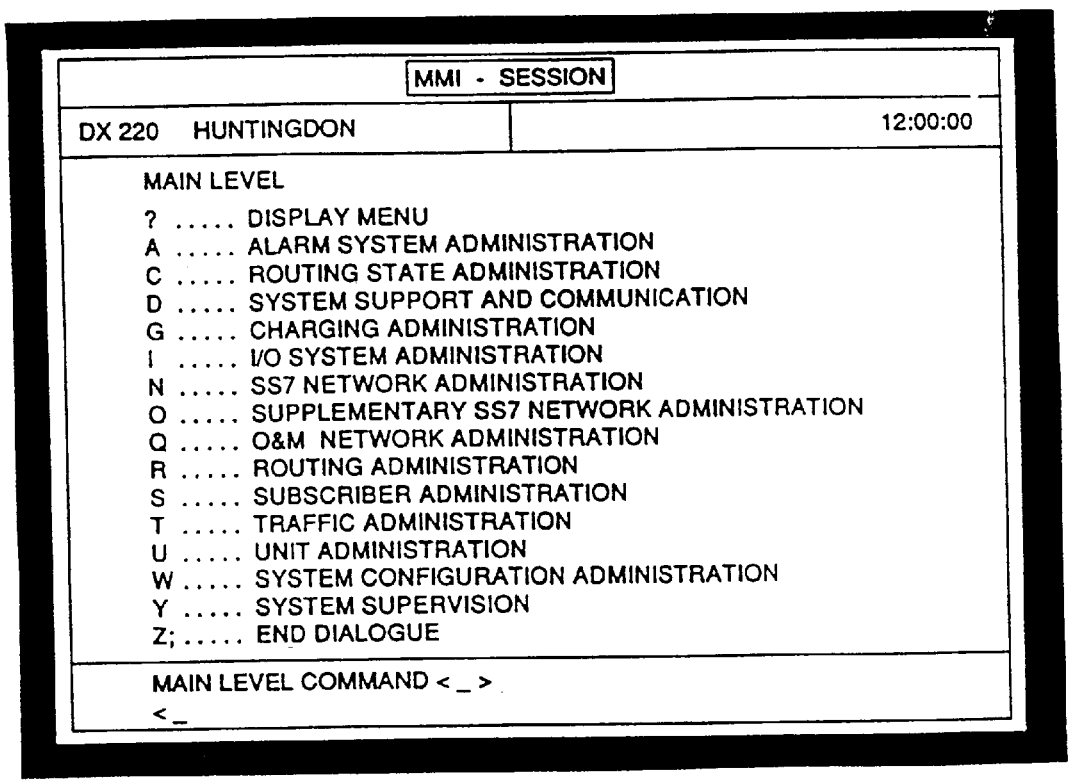
FIG. 1 shows the menu displayed to the operator at the main level.
Figure 2:
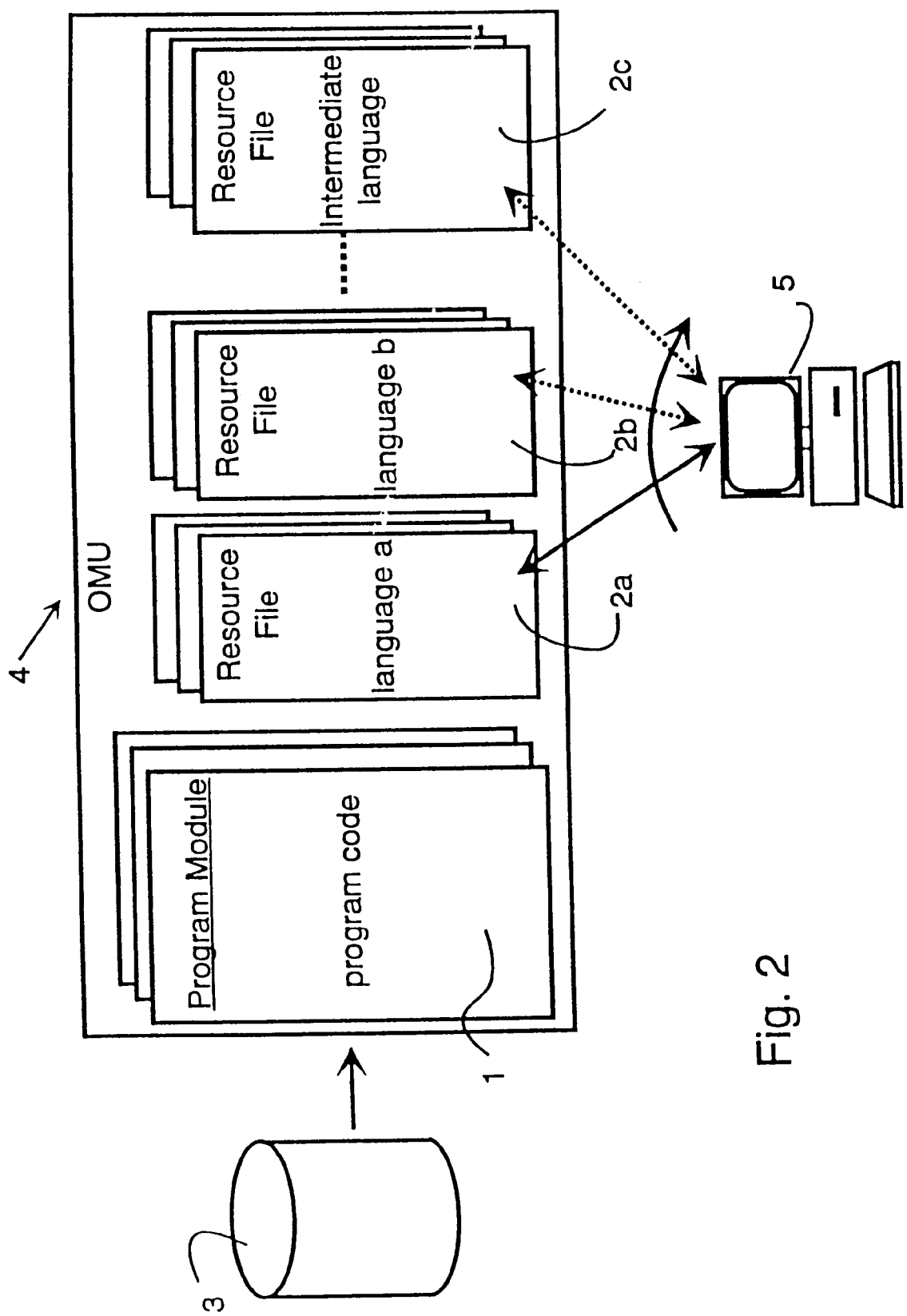
FIG. 2 shows the organization of the program code and text files of the commands of the multilingual operation and maintenance interface according to the invention.

According to FIG. 2, the program modules of the MML program in the central memory 4 of the operation and maintenance interface of the OMU in the exchange are denoted by reference numeral 1. Thus, for example the main level of the program has its own program module, and the ASCII record of the resource file is related to the program code of that program module, the record producing the view shown in FIG. 1 on the display unit of the operator. Correspondingly, each command group is encoded into its own program module, whereupon the 4 to 8 commands of the command group are included in the same program code to be handled as one program entity. The programs of the command system are stored in a disk storage 3 or the like, from where they are loaded for execution when a command included in that group is to be used.

According to a first part of the invention, all texts, related to the modules 1 of the program, intended for the display of the operator's device or related to the interactive communication (instruction messages, output headings etc.) are distinguished from the program code of the module as one or several separate resource files 2a, 2b, 2c. Each resource file comprises texts in a desired language. The language (a) of the texts of the resource file a could be, for example, English, and the language (b) of the texts of resource file b could be, for example, Russian. For each file, a separate resource file library is needed, whereupon there are as many possible languages to be used in the session as there are resource libraries.

According to a second part of the invention, at least one resource file 2c is a special intermediate language file. The intermediate language is no human language. The special itermediate language file comprises intermediate language information in a manner described later.

During the loading of a program code of a module 1 related to one session, the resource files related to that program are also loaded to the central memory 4. It is also possible to load only the resource files in a default language of the exchange, at the beginning of the connection, from the disk 3. The program code 1 is common to all languages of the resource files. Only the resource files in active use are changed according to the choice of the operator. The operation and maintenance can thus be performed from the display terminal 5 in the desired language on the same conditions as in the original or default language of the system.

During the session, the language can be changed anytime, in which case the command system loads into the memory the resource files of the new language included in that command group, and the session continues in another language. The changes from one language to another are possible during any stage of the session, for example, by means of a control button defined for the language change. In a possible concurrent session, the method is similar, the sessions operating simultaneously and independently of each other. The language may be changed separately for each session. The concurrent session may follow its own language completely independently of the languages of other sessions. Thus, there may be several (if necessary, even dozens of) languages simultaneously.

Figure 3:
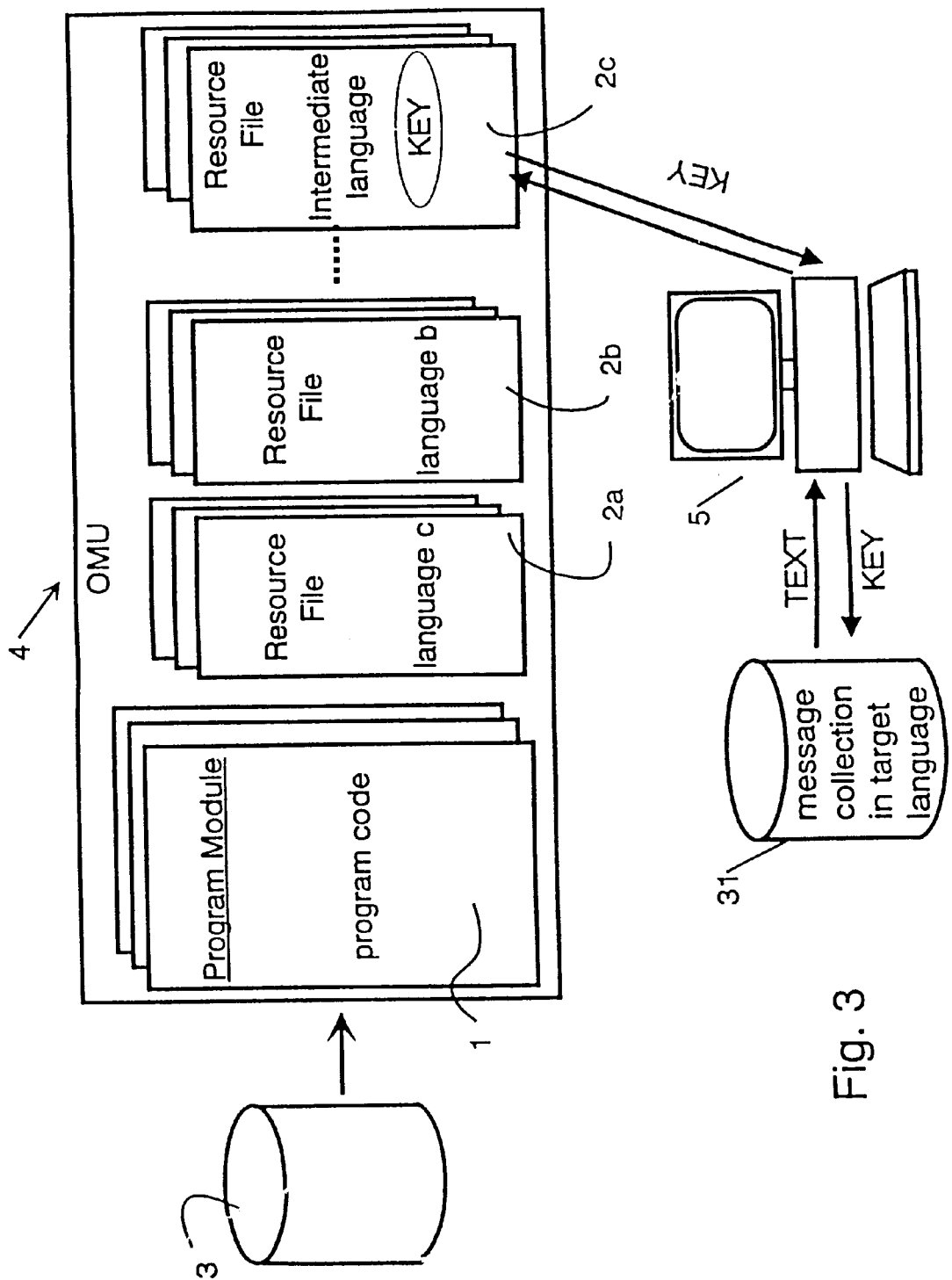
FIG. 3 shows the first embodiment.

FIG. 3, employing the same reference numerals for identical points as FIG. 2, shows the first preferred embodiment of an intermediate language file 2c. If the structural and logical differences between the source language, such as English, used in the operation and maintenance interface and the desired target language, such as Chinese, are too great for a reasonable target language command structure to be provided in the operation and maintenance interface, the resource file of the target language can be realized by means of the intermediate language of the resource file 2c. This occurs in such a way that the resource file 2c containing intermediate language comprises search keys, which may be numerical codes. When the program gets to the point where it would normally output a text in some language, it outputs instead an individual code, when the resource file in the intermediate language has been selected. When the program responds to the operator's computer 5, the data flow comprises the aforementioned codes acting as search keys. The operator has created his own target language database 31, in which a search key is provided for each text record. When the computer 5 of the operator receives the search key, it can immediately and almost without a delay retrieve from the database 31 the text corresponding to the search key and show it on the display of the computer 5.

The advantage of this embodiment is that the instruction messages and the texts of the command system do not have to be translated into the target language as such, but instead of the resource files in the target language, resource files 2c in the intermediate language are loaded into the memory, and these files act as an interpreter between the MML program and the user interface realized in a natural language. The intermediate language is transparent to the operator, and is used to control, for example, the target language keyboard and the character generator of the screen of the operator's terminal equipment 5, or the intermediate language controls for example, a program, which performs translation between the intermediate language and the target language, in a personal computer.

Figure 4:
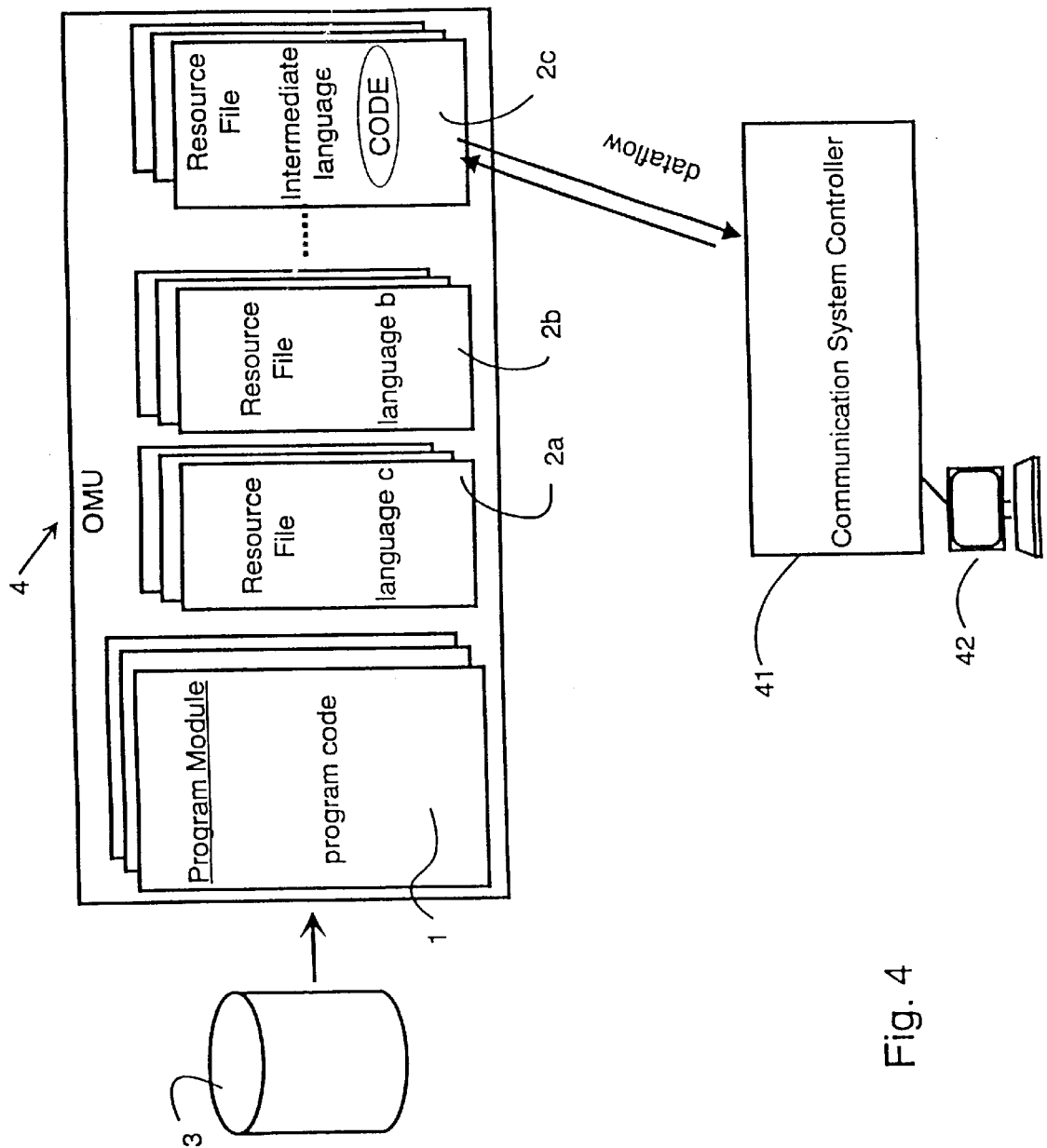
FIG. 4 shows the second embodiment.

FIG. 4, employing the same reference numerals for identical points as FIGS. 2 and 3, shows the second preferred embodiment of the intermediate language file 2c. It is applicable especially in cases where the exchange is controlled by means of a separate network management computer 41. The response of the MML program with its text parts is intended for a human. This is difficult for a machine, since processing the response would require the deletion of the texts. This difficulty is eliminated because the operator creates the resource file 2c in the intermediate language by placing desired codes to replace the alphanumeric text, whereby the information flow produced by the MML program becomes suitable for machine processing. When the normal text section, intended for a human, in the flow of information arriving to the network management computer 41 is replaced with a control code, the network management computer 41 operates according to these codes. By means of the codes, it is possible to delete parts of a file, to rearrange records etc. Thus, it is easy to produce, by means of the computer 41, for example, different graphic representations to be shown on the display unit 42 by processing the incoming flow of data in a desired manner.

The advantage of this embodiment is that the operator can himself process the responses of the program in a desired manner without altering the MML program and without interrupting the operation of the exchange in any way. Changes possibly made later to the MML program code do not affect at all the response processing performed by the operator.

It is clear for one skilled in the art that the different embodiments of the invention are not restricted to the examples described above, but they may vary within the scope of the appended claims.

I claim:

1. A multilingual operation and maintenance interface for a telecommunications exchange, the multilingual operation and maintenance interface being constructed and arranged to forward a control provided from an external device to a telecommunications exchange, and the multilingual operation and maintenance interface constructed and arranged to forward a control response to the external device to be displayed in a target language, the multilingual operation and maintenance interface comprising a memory including:

a plurality of program modules; and
   a plurality of resource files, wherein:
      all alphanumeric information related to interactive communication with the multilingual operation and maintenance interface is separated from program code of the program modules and stored in a resource file in a different target language,
      at least one of the resource files is an intermediate language file comprising intermediate language information, the intermediate language information being other than the alphanumeric information in the target language,
      when the program modules needed in each operation and maintenance session are loaded, related resource files in a default language and selected ones of the resource files selected by a user are loaded into the memory.

2. A multilingual operation and maintenance interface according to claim 1, wherein:
   the intermediate language information of the intermediate language file comprises a plurality of search keys,
   a database in the target language comprises alphanumeric information and is connected to the external device, the database including a plurality of data units,
   the search key of each of the data units is included in the intermediate language file, whereupon the external device, upon receiving the search key from the intermediate language file of the multilingual operation and maintenance interface, immediately retrieves the alphanumeric information from the database, corresponding to the search key, to be shown on the display of the external device.

3. A multilingual operation and maintenance interface according to claim 1, wherein:

the intermediate language information of the intermediate language file comprises control codes, and external device is a separate computer, the control codes being selected according to a purpose so that a flow of data received by the separate computer is suitable for processing.

4. A multilingual operation and maintenance interface according to claim 1, wherein during an operation and maintenance session, the target language is changed by bringing a desired corresponding resource file in the changed target language into the memory.

5. A multilingual operation and maintenance interface according to claim 1, wherein during a plurality of operation and maintenance sessions of a plurality of users, the target language can be selected separately for each of the users.

6. A multilingual operation and maintenance interface according to claim 2, wherein the database is created by an operator.

7. A multilingual operation and maintenance interface according to claim 2 wherein the search keys, in a form of the intermediate language information are created by an operator and stored as the intermediate language file.

8. A multilingual operation and maintenance interface according to claim 3, wherein the control codes are in a form of the intermediate language information and are created by an operator and stored as the intermediate language file.

9. A method of operating and maintaining a telecommunications exchange, comprising:

forwarding a control provided from an external device to the telecommunications exchange;

using a resource file, which is an intermediate language file including a plurality of search keys, with a multilingual operation and maintenance interface of the telecommunications exchange to translate alphanumeric information related to interactive communication from a first language to an intermediate language; and forwarding a control response to the external device, the external device constructed and arranged to translate the intermediate language included in the control response to a target language and to display information corresponding to the control response.

10. A method according to claim 9, further comprising:

creating a database to be used by the external device, the database being in the target language and being created by an operator.

11. A method according to claim 9, wherein the plurality of search keys are created by an operator.

\* \* \* \* \*